US008583280B1

(12) United States Patent
Patel

(10) Patent No.: US 8,583,280 B1
(45) Date of Patent: Nov. 12, 2013

(54) VENDING MACHINE NUTRITIONAL INFORMATION DISPLAY SYSTEM USING STANDARD INVENTORY CONTROL SYSTEM COMPONENTS

(75) Inventor: Paresh K. Patel, Portland, OR (US)

(73) Assignee: VendScreen, Inc., Portland, OR (US)

( * ) Notice: Subject to any disclaimer, the term of this patent is extended or adjusted under 35 U.S.C. 154(b) by 134 days.

(21) Appl. No.: 12/768,726

(22) Filed: Apr. 27, 2010

(51) Int. Cl.
*G06F 17/00* (2006.01)
*G07F 7/00* (2006.01)

(52) U.S. Cl.
USPC ........... 700/232; 700/231; 700/236; 700/237; 194/217

(58) Field of Classification Search
USPC ............ 700/236, 241, 231, 232; 705/28, 400; 194/217
See application file for complete search history.

(56) References Cited

U.S. PATENT DOCUMENTS

| | | | | |
|---|---|---|---|---|
| 5,844,808 | A | 12/1998 | Konsmo et al. | |
| 6,462,644 | B1 | 10/2002 | Howell et al. | |
| 7,085,556 | B2 | 8/2006 | Offer | |
| 7,299,576 | B2 | 11/2007 | Martin et al. | |
| 7,490,054 | B2 | 2/2009 | Reade et al. | |
| 2005/0278065 | A1 | 12/2005 | Garza | |
| 2006/0074777 | A1 | 4/2006 | Anderson | |
| 2006/0219517 | A1* | 10/2006 | Cheng et al. | 194/217 |
| 2009/0157220 | A1* | 6/2009 | Walker et al. | 700/232 |
| 2009/0303982 | A1 | 12/2009 | Blachman et al. | |

OTHER PUBLICATIONS

Glenn Butler, "DEX: What it is, how you can use it, and why it will change our industry," Automatic Merchandiser Magazine, www.vendingmarketwatch.com, Sep. 2004, 9 pages.
Gene Ostendorf, "Automatic Merchandiser: DEX and MDB: A Primer for Vendors," Cygnus Business Media, Feb. 7, 2008, 4 pages.
"Electronic Technologies Evolve, Working Together to Improve Efficiencies," Automatic Merchandiser Magazine, www.vendingmarketwatch.com, Apr. 2, 2009, 9 pages.
Michael L. Kasavana, "V-Commerce: Understanding Vending Machine Technology," Hospitality Net, www.hospitalitynet.com, Apr. 19, 2002, 7 pages.
"MEI EASITRAX remote data port: Maximum Flexibility for Your Vending Machine," www.meigroup.com, MEI Corporate Headquarters, Jun. 2007, 2 pages.
"MEI EASITRAX remote data port: Maximum Flexibility for Your Vending Machine," MEI Corporate Headquarters, www.meigroup.com, Jun. 2007, 2 pages.
"The MIND: Nutritional Information Touch Screen," Vendors Exchange International, Incorporated, www.veii.com, 2008, 4 pages.
"Tell Me About Intelligent Vending," MEI Corporation, www.easitrax.com, viewed on Apr. 23, 2010, 1 page.
"Seed," Cantaloupe Systems, www.cantaloupesys.com, viewed on Apr. 23, 2010, 1 page.

* cited by examiner

*Primary Examiner* — Sun Li
(74) *Attorney, Agent, or Firm* — Smith Moore Leatherwood LLP

(57) ABSTRACT

A method for using a vending machine nutritional information display system using standard inventory control system components. A vending machine nutritional information display system using standard inventory control system components. An apparatus for implementing a vending machine nutritional information display system using standard inventory control system components.

20 Claims, 9 Drawing Sheets

VENDING MACHINE NUTRITIONAL INFORMATION DISPLAY SYSTEM USING STANDARD INVENTORY CONTROL SYSTEM COMPONENTS

BACKGROUND OF INVENTION

Described herein is a vending machine nutritional information display system and, more specifically, a vending machine nutritional information display system using standard inventory control system components.

Vending machines (or "automatic retailing" machines), in the broadest sense, have been around for thousands of years. The first simple mechanical coin operated vending machines were introduced in the 1880s. Modern vending machines stock many different types of products including, but not limited to drinks (e.g. water, juice, coffee, and soda) and edible food products/items (e.g. snacks, candy, fruit, and frozen meals). Typically, a user will look at the front face of the vending machine to determine which product he would like. From the front face the user may be able to see names of the products, logos indicating the products, pictures of the products, and/or products themselves (e.g. if the front face is typically glass so the contents of the vending machine can be seen). Once the user has determined which product he would like, he inserts payment (e.g. coins, bills, or payment cards). He then inputs his selection into the vending machine using a user interface such as a series of buttons, a key pad, touch screen, or other input mechanism using, for example, the column ID at which the desired product is located. The column ID may be a number indicating a row and a letter indicating the left to right position within the row. So the top left column ID might be A1. Based on the user's inputted column ID, technology within the vending machine provides the desired product to the user. The term "vending machine" is meant to be inclusive and to include all types of vending machines, not only those shown and discussed herein.

In this fast paced world, vending machines are ubiquitous. For example, an office building or hotel (referred to generally as a "field site") having twenty floors might have one or more rooms for vending machines (either a dedicated room or a kitchen or lunchroom) on every floor. And in each room there is, on average, three to five vending machines. The location of each vending machine is referred to as a "machine site." Each vending machine route merchandiser (or "merchandiser") might service a hundred such field sites on a route, each field site having anywhere from one machine site to hundreds of machine sites. Merchandisers obtain inventory or products to stock the vending machines from a warehouse or distribution center that stocks many different types of products. A "vending service company" might service many routes from many warehouses or distribution centers. The location from which the vending service company manages its vending machine network is referred to as a "management site" which may be located at a warehouse or distribution center or it may be located in a separate or remote location.

To manage such a vending machine network, modern vending service companies have taken advantage of technological progress in the vending machines themselves. Inventory control systems have become common. These inventory control systems include components such as vending machines having processing units, vending machine audit technology, and management technology. These inventory control systems also use management programs and communication programs.

Many vending machines have processing units built into (or retrofitted into) them. These processing units can be accessed both to provide vending machine related data and to obtain vending machine related data. Typical "vending machine related data" (also referred to as "vending machine data") includes, for example, information about the funds (bills, coins, and cashless) received by the machine and the products stocked in and/or sold by the machine (e.g. the products and prices in the vending machine). Common or standard (industry standard) "vending machine protocols" used for communicating with vending machines in order to exchange the vending machine data include, for example, DEX/UCS, MDB, and DDCMP. These industry standard vending machine protocols have definitions that are readily available and not replicated herein.

To communicate with the vending machines' processing units, merchandisers use "vending machine audit technology" that is usually portable and/or handheld to obtain the vending machine data. Further, the audit technology is synchronized with "management technology" that is located at the management site so that the vending machine data from the vending machine can be used for management purposes at the management site. Exemplary audit technology is described in U.S. Patent Publication No. 2009/0303982 to Blachman et al. (the "Blachman reference"), U.S. Patent Publication No. 2006/0074777 to Anderson (the "Anderson reference"), and other references disclosed herein, all of which are hereby specifically incorporated by reference.

"Management programs" use the vending machine data in a variety of ways including, but not limited to cash management, inventory management (tracking or predicting), and/or remote management. "Communication programs" allow communications between the vending machines, the audit technology, and/or management technology at the management site. The communication programs use the vending machine protocols to assist in the exchange of the vending machine data.

In recent years, many improvements to modern vending machines have been suggested. Many of the innovations relate to means for communicating with the vending machine. Some of these communication innovations are detailed in U.S. Pat. No. 7,085,556 to Offer (the "Offer reference"), U.S. Pat. No. 6,462,644 to Howell et al. (the "Howell reference"), and U.S. Pat. No. 5,844,808 to Konsmo et al. (the "Konsmo reference"). These references are herein incorporated by reference.

The Offer reference is directed to a vending machine that is designed to communicate with a cellular phone. A user of the vending machine disclosed in the Offer reference would use his cellular phone to provide a signal that, when received by the vending machine, would cause the dispensing of a product.

The Howell reference is directed to networking technologies (including wireless technologies) that allow multiple vending machines to be networked together so that information from the vending machines can be used in the building of a database that can be made available to bottlers interested in individual vending machine routing needs and profitability.

The Konsmo reference is directed to two-way communications with networked remote vending machines. The Konsmo reference describes vending machines having sensors that detect the occurrence of specified events such as sales of goods, unauthorized entry into the vending machine, and notification of low inventory stock.

Users of traditional vending machines are unable to see product nutritional (including ingredient) information prior to purchase. The product is enclosed in the vending machine so users do not have access to the nutritional information from the product package. Even if the vending machine displays the product itself (e.g. through a glass face, glass window, or glass door), the users cannot touch the package nor see the backside of the package that usually provides the "nutrition facts label" (the nutritional information) as mandated by law.

Posting comprehensive nutritional information adjacent to the machine for products is impractical. While a typical vending machine merchandises about forty different products, there can be at any given time hundreds or thousands of potential products that an operator could stock in the vending machine. Moreover, the list of available products is fluid and constantly changing so a static list would become out-of-date in short order. Moreover, from a user's perspective, finding the nutritional information in a list adjacent to the machine would be time consuming and inconvenient if hundreds or thousands of products were listed.

References such as U.S. Pat. No. 7,299,576 to Martin et al. (the "Martin reference"), U.S. Patent Publication No. 2005/0278065 to Garza (the "Garza reference"), and U.S. Pat. No. 7,490,054 to Reade et al. (the "Reade reference") disclose new types of displays for vending machines. These references are herein incorporated by reference.

The Martin reference is directed to a vending machine display and apparatus. The Martin reference teaches a display that is associated with user-manipulated control and/or with a product in the vending machine dispensed by operation of the user-manipulatable control. In some embodiments, the display is responsive to the controller by changing graphics and/or text displayed by the display.

The Garza reference is directed to remote posting of nutritional information. More specifically, the Garza reference relates to a vending machine equipped with a remote nutrition informing system in which nutritional information is displayed separate from the food or beverage product or its packaging; thereby making information available to consumers that otherwise would not have been available prior to purchase. The Garza reference also discloses that the nutrition informational display provides at least one category identifier representative of a dietary category of food along with a corresponding brief description and at least one food product that has a label associated to it, the label displaying all category identifiers that are represented in the at least one food product.

The Reade reference is directed to an RFID system and method for vending machine control. The Reade method and system seeks to aid consumers in making informed decisions prior to purchasing products from a vending. The Reade reference further discloses that product information may be visually displayed on a visual display screen.

BRIEF SUMMARY OF THE INVENTION

Described herein is a vending machine nutritional information display system and, more specifically, a vending machine nutritional information display system using standard inventory control system components.

Described herein is a method for using a vending machine nutritional information display system using standard inventory control system components including at least one vending machine and at least one management technology. The method includes the steps of transmitting vending machine data from the vending machine to the management technology using standard vending machine protocol, the vending machine data including inventory data; receiving the vending machine data from the vending machine at the management technology; merging the vending machine data with nutrition data from a nutrition facts data server based on the inventory data to obtain merged data; transmitting the merged data from the management technology to the vending machine using standard vending machine protocol; receiving the merged data from the management at the vending machine; and displaying nutrition data on a display of the vending machine based on user selection of products. Audit technology and/or communication technology may be used as an intermediary in the transmission of data.

Also described herein is a vending machine nutritional information display system using standard inventory control system components including at least one vending machine. The system includes a management program for receiving vending machine data from the at least one vending machine using standard vending machine protocol, the vending machine data including inventory data. The system also includes a nutrition facts data server including nutrition data for products listed in the inventory data. The management program merges the vending machine data with the nutrition data based on the inventory data to obtain merged data. The management program then transmits the merged data to the at least one vending machine for display of the nutrition data based on user selection of products. Audit technology and/or communication technology may be used as an intermediary for transmission performed between the management program and the vending machine.

Finally described herein is an apparatus for implementing a vending machine nutritional information display system using standard inventory control system components including at least one vending machine. The apparatus includes at least one communication program associated with the vending machine for controlling at least one communication interface technology associated with the vending machine. The apparatus also includes at least one management subprogram associated with the vending machine for controlling at least one processing unit associated with the vending machine. The at least one management subprogram and the at least one communication program use standard vending machine protocol for transmission of vending machine data including inventory data and receipt of merged data including nutrition data for products listed in the inventory data, the merged data being stored in at least one memory. At least one display associated with the vending machine displays nutrition data in response to user selection of product. The apparatus may further include a stand-alone device that includes the at least one management subprogram, the at least one communication program, and the at least one communication interface technology.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

The accompanying drawings, which are incorporated in and constitute a part of this specification, illustrate various exemplary vending machine nutritional information display systems and components thereof.

DETAILED DESCRIPTION OF THE INVENTION

Figure 6:
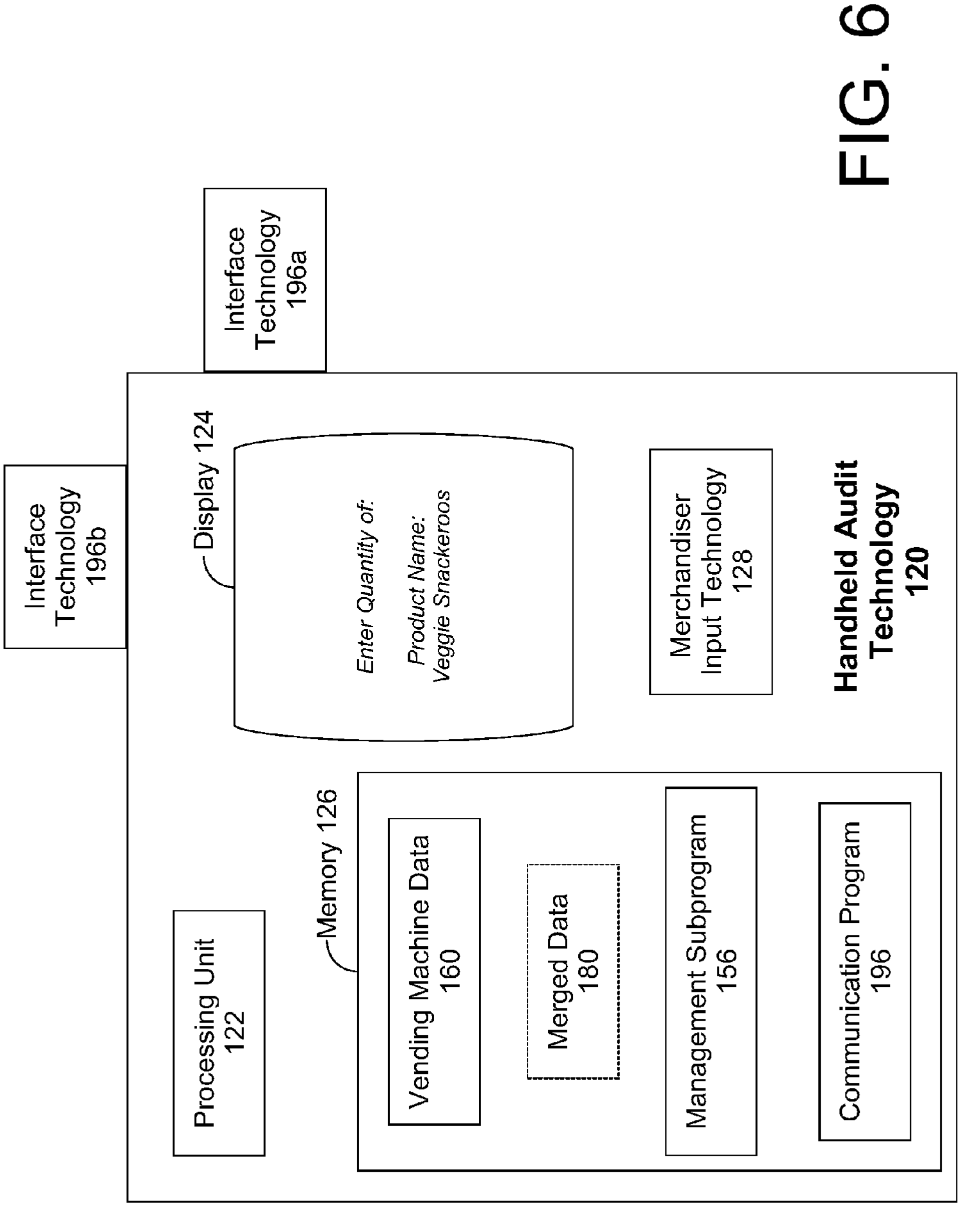
FIG. 6 is a simplified schematic diagram of an exemplary handheld audit technology that is usually portable and/or handheld.
Figure 7:
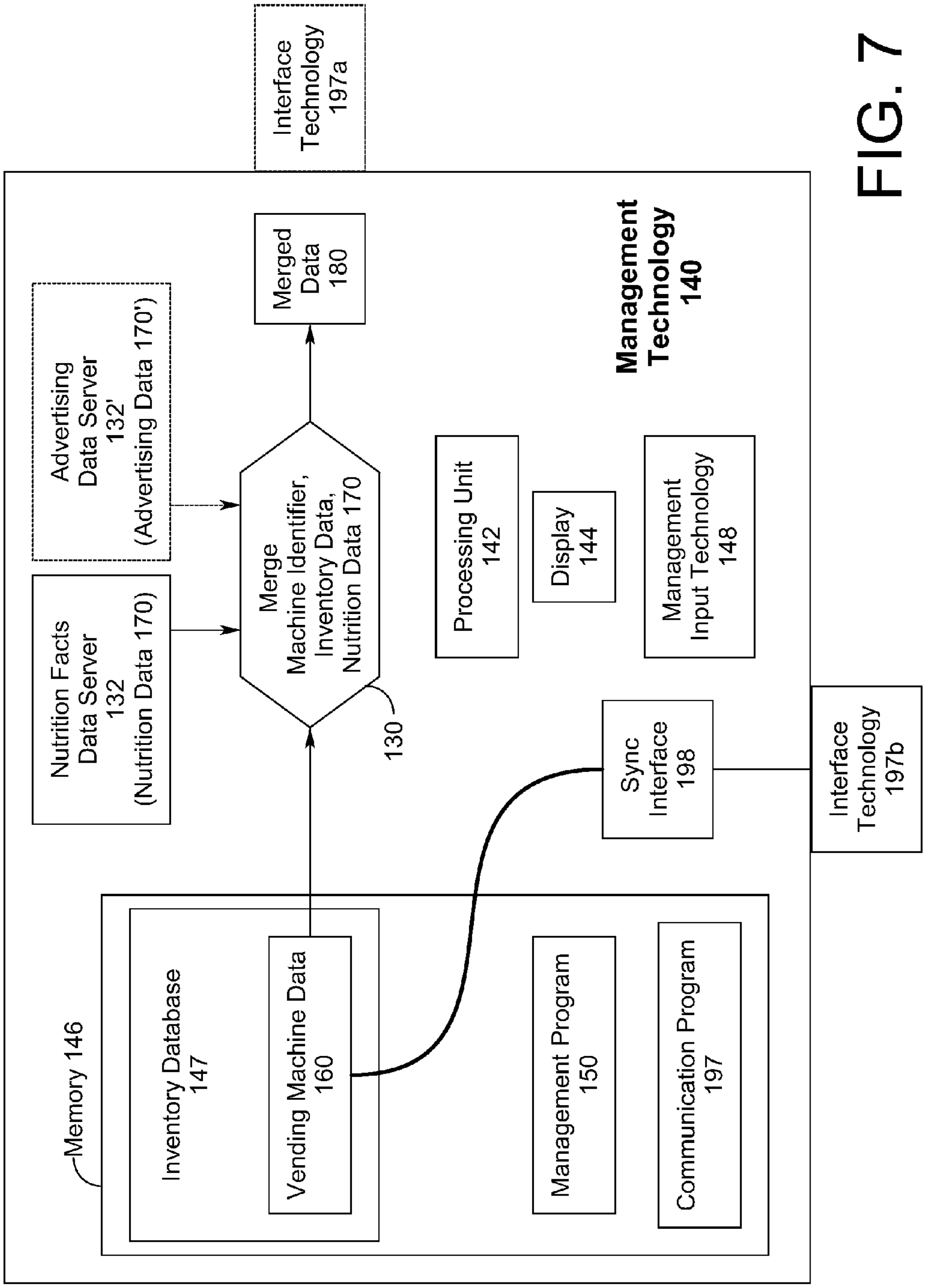
FIG. 7 is a simplified schematic diagram of management technology.

As shown in FIGS. 1-4, a vending machine nutritional information display system includes at least one vending machine 100 (FIG. 5), at least one audit technology 120 (FIG. 6), and management technology 140 (FIG. 7). The vending machine nutritional information display system uses standard inventory control system components such as vending machines, vending machine audit technology, and management technology as well as common or standard vending machine protocols. The vending machine nutritional information display system includes a method and apparatus by which nutritional information for products stocked within a vending machine 100 is displayed on a vending machine display 104. A management program 150 merges vending machine data 160 from the vending machine 100 with nutritional information (nutrition data 170) and transmits the merged data 180 (including the nutrition data 170) using communication technology 190 (and associated communication interface technology and communication programs) to the vending machine 100 for display to the user.

Figure 1:
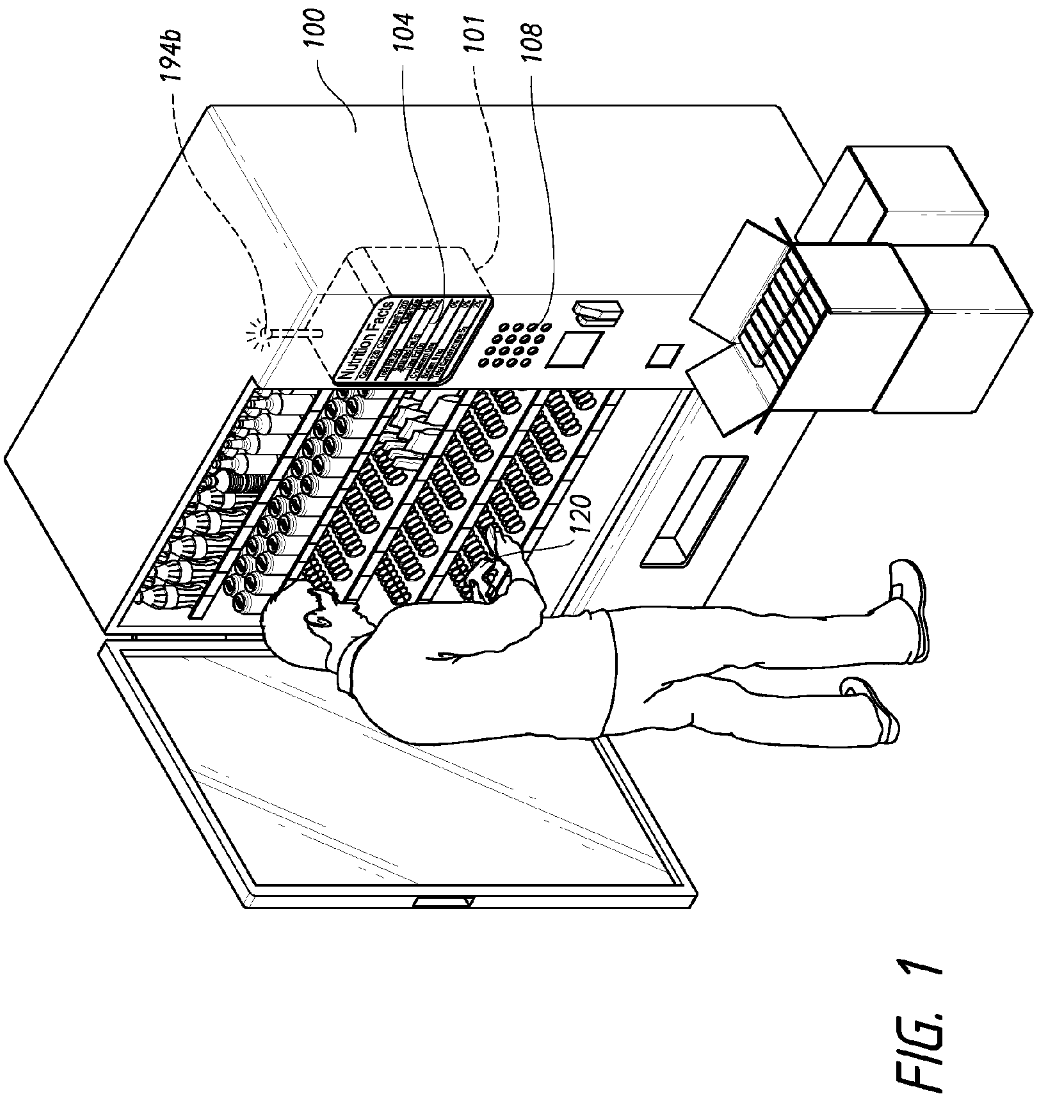
FIG. 1 is a front perspective view showing an exemplary vending machine with a display being audited by a merchandiser with a handheld audit technology, the vending machine and audit technology being vending machine nutritional information display system in which nutritional information about the products stocked in the vending machine is presented on the vending machine display.

FIG. 1 shows an exemplary vending machine 100 that is retrofitted with a stand-alone device 101 that includes, for this example, a processing unit (not shown), the display 104, memory (for storing, for example, merged data, a management subprogram, and a communication program, none of which are shown), and/or communication interface technology (shown as an antenna 194*b*). The user input technology 108 from the original vending machine 100 is used in this updated vending machine and is able to interface with the stand-alone device 101 communication interface technology (e.g. wired or wireless, none of which are shown here). The merchandiser is shown as using a handheld audit technology 120 to stock product in the vending machine 100 as he would stock product in a non-updated vending machine. For the merchandiser, the process of stocking the machine can be substantially or exactly the same. For the user who approaches the updated vending machine, however, the process can be very different if the user desires additional information that would not have been available using traditional vending machines. Rather than trying to guess the nutritional information of a favorite snack (or alternatives thereto), the user is able to select the product (using user input technology 108) and, in response to the selection, nutritional information related thereto is displayed on the display 104. The user may also be given the option to filter his search based on preferences (e.g. low calories) using the user input technology 108 and the display 104. The display 104 may also display advertisements related to the selected product or similar products. In one scenario, the user might first select a high caloric chocolate bar and see the calorie information displayed on the nutritional information. Then the user might select the filter for low calories and be presented with several low calorie options on the display. The intelligent system described herein might surmise that the user would like a low calorie chocolate snack and display an advertisement next to the options of a low calorie carob bar that is also available in the vending machine. Information about the display of the advertisement and whether the user purchased the advertised product may be recorded and transmitted to the management technology for analysis.

Figure 2:
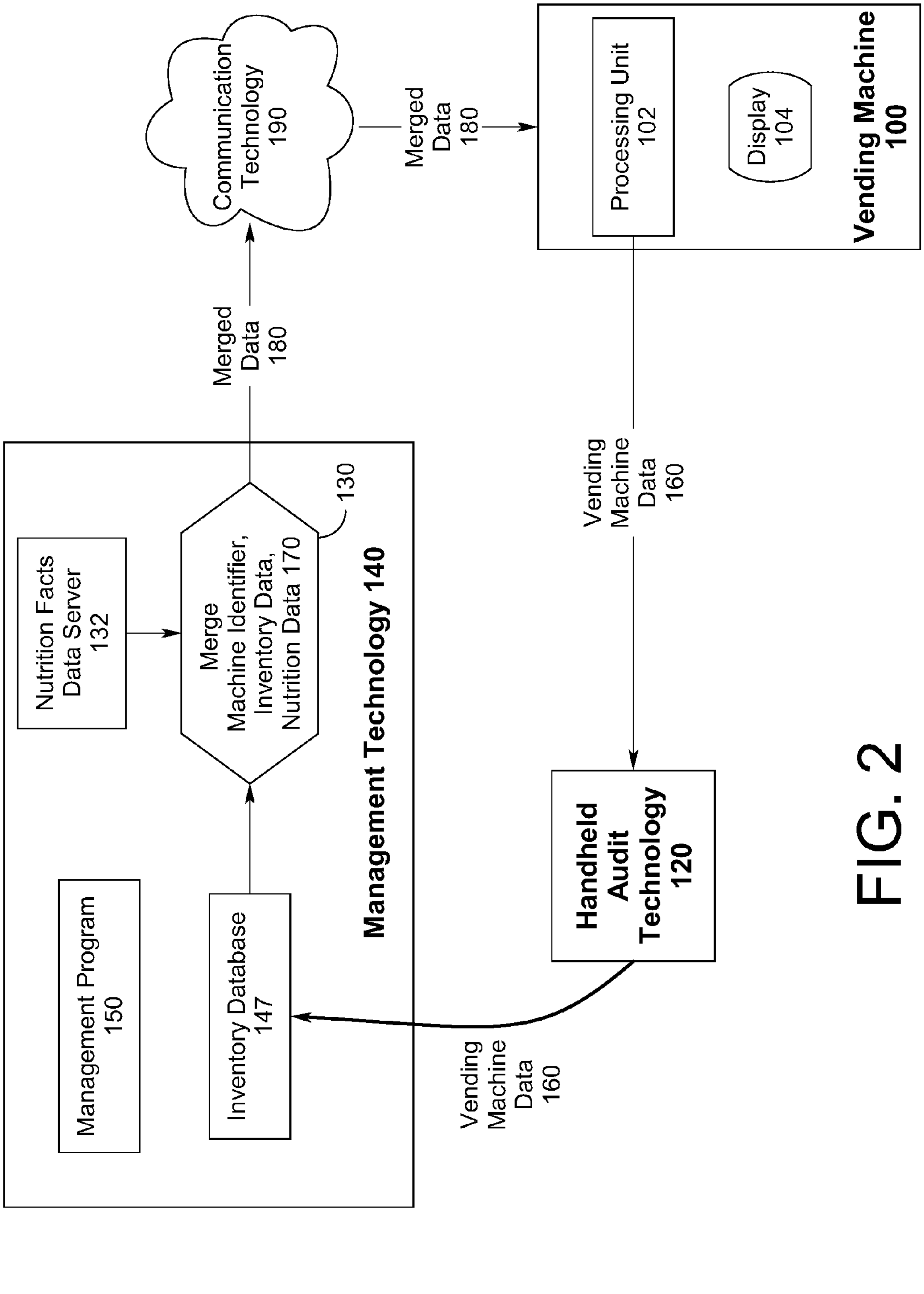
FIG. 2 is a simplified schematic diagram of a first preferred exemplary vending machine nutritional information display system.
Figure 3:
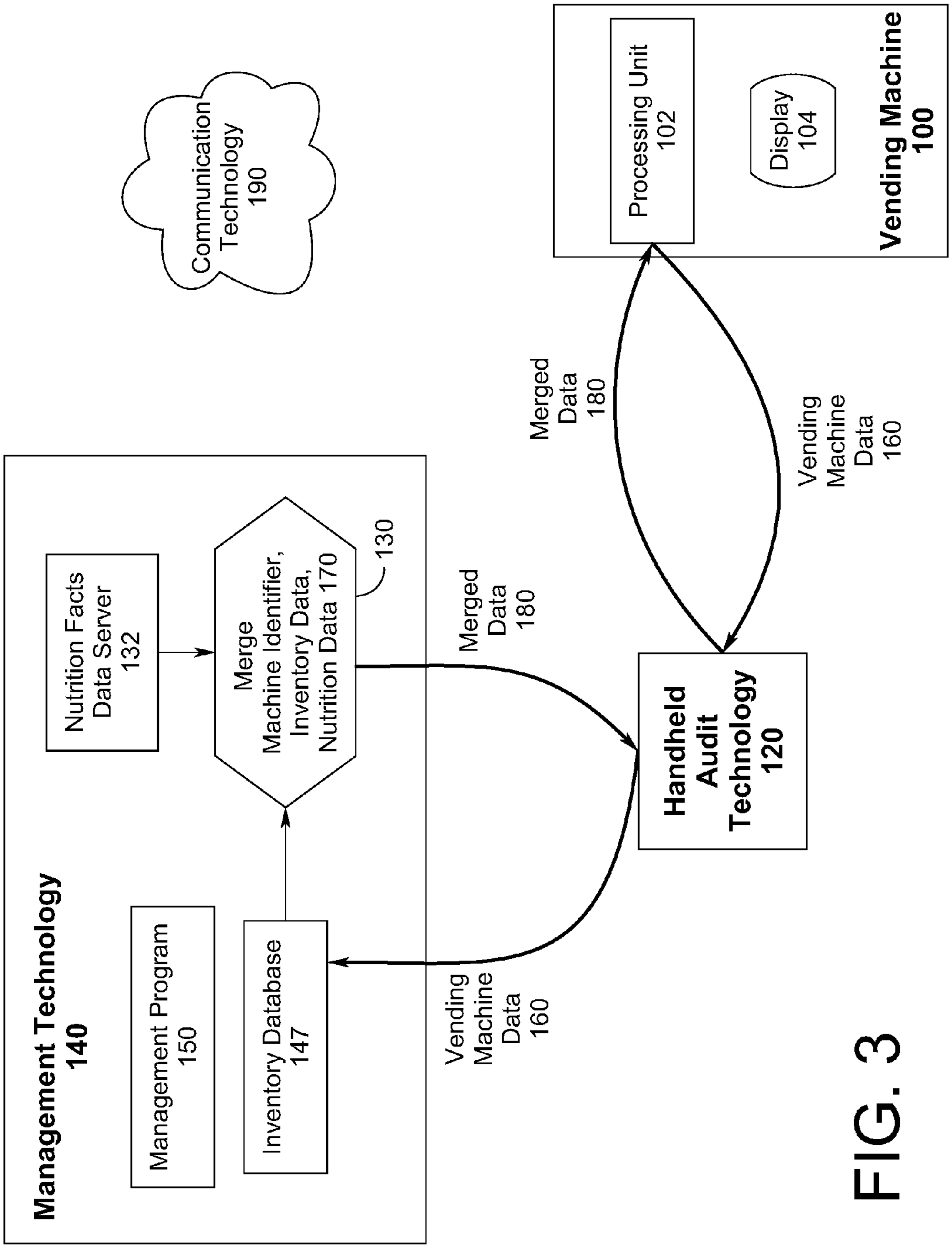
FIG. 3 is a simplified schematic diagram of a second preferred exemplary vending machine nutritional information display system.
Figure 4:
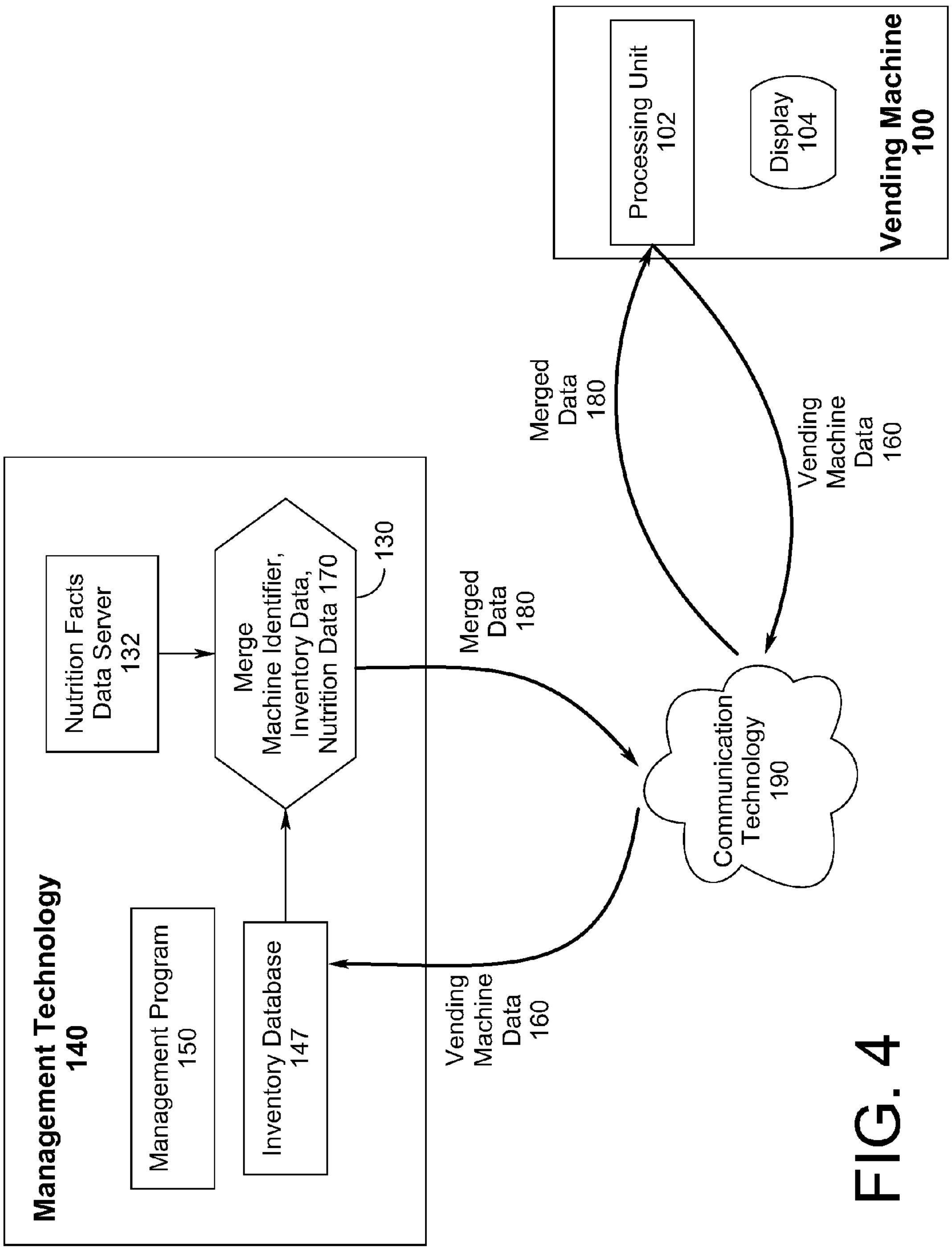
FIG. 4 is a simplified schematic diagram of a third preferred exemplary vending machine nutritional information display system.

FIGS. 2-4 show preferred exemplary vending machine nutritional information display systems. The first exemplary vending machine nutritional information display system shown in FIG. 2 shows vending machine data 160 flowing from the vending machine 100 to the audit technology 120 and then to the management technology 140 where it is merged to include nutrition data 170. The merged data 180 then flows through communication technology 190 (e.g. antennas, wireless networks, and/or the Internet) to the vending machine 100 where the nutrition data 170 can be displayed based on or in response to user selection of products. The second exemplary vending machine nutritional information display system shown in FIG. 3 shows vending machine data 160 flowing from the vending machine 100 to the audit technology 120 and then to the management technology 140 where it is merged to include nutrition data 170. The merged data 180 then flows through audit technology 120 to the vending machine 100 where the nutrition data 170 can be displayed based on or in response to user selection of products. The third exemplary vending machine nutritional information display system shown in FIG. 4 shows vending machine data 160 flowing from the vending machine 100 to the management technology 140 (via communication technology 190) where it is merged to include nutrition data 170. The merged data 180 then flows to the vending machine 100 (via communication technology 190) where the nutrition data 170 can be displayed based on or in response to user selection of products. This embodiment eliminates the use of the audit technology.

It should be noted that for all of these exemplary systems, communication technology 190 (and associated communication interface technology and communication programs) includes all types of wired and wireless transfer of data between the components 100, 120, 140 (so FIG. 4 could be considered a wireless transfer of data between the vending machine 100 and the management technology 140).

Figure 5:
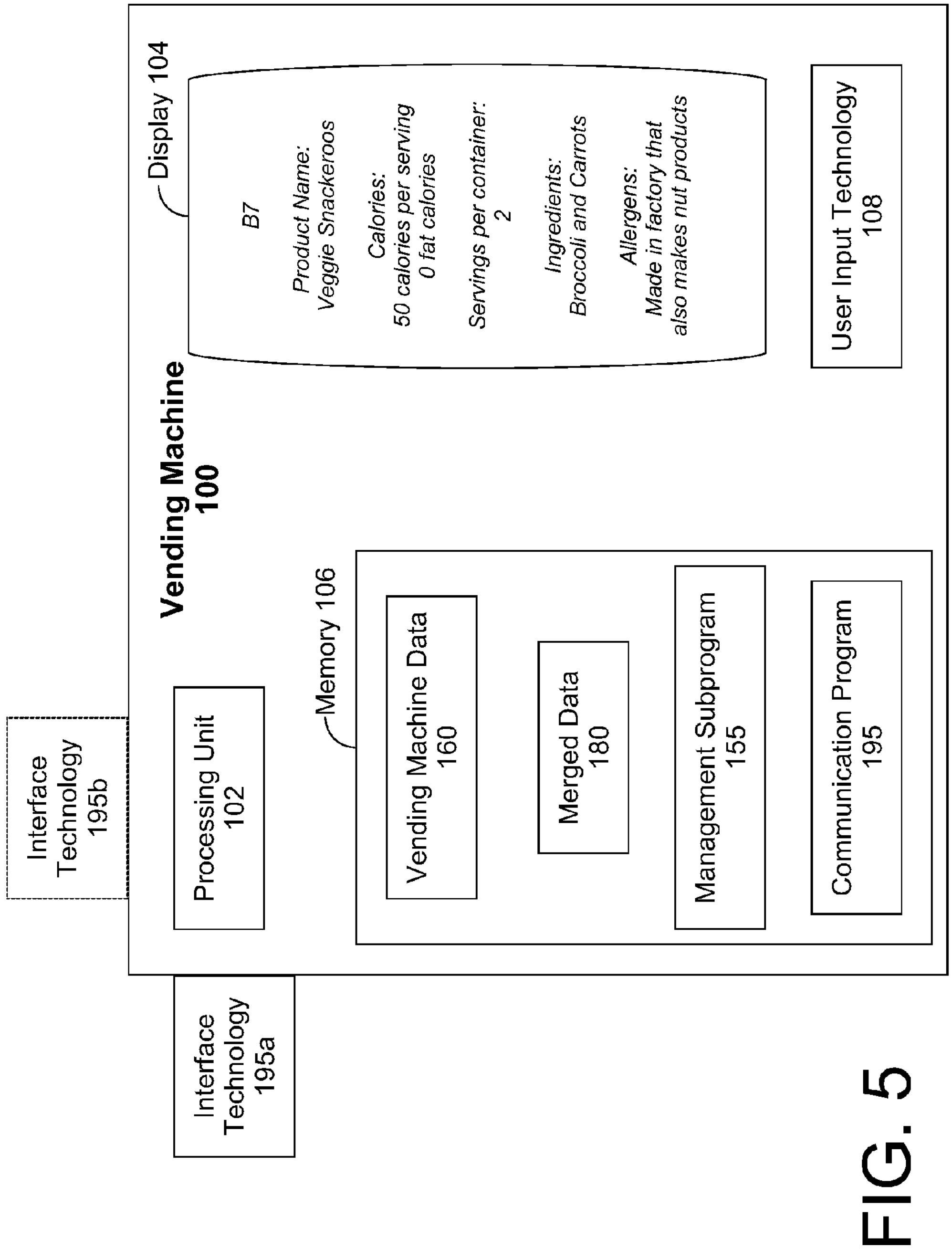
FIG. 5 is a simplified schematic diagram of a vending machine having a vending machine processing unit and a display.

Vending Machine 100 (FIG. 5)

A vending machine, as shown in FIG. 5, preferably has at least one "associated" processing unit 102, at least one associated display 104, at least one associated memory 106 (for storing, for example, vending machine data 160, merged data 180, at least one management subprogram 155, and/or at least one communication program 195), at least one associated user input technology 108, and/or at least one associated communication interface technology 195*a* and 195*b*. The processing unit 102, display 104, memory 106, user input technology 108, and/or communication interface technology 195*a* and 195*b* may be combined as a single package (e.g. all the components are sold as a stand-alone device 101 or "box" that may be retrofitted into existing vending machines), may be separate components (e.g. each component is distinct so that if an original vending machine has almost all the necessary technology only the missing component(s) would need to be added), or may be a combination thereof (e.g. the display 104 could be a separate unit, but all the other components could be combined into a single package (stand-alone device 101), so that if a vending machine already had a suitable display, only the package of the other components would be needed). Although the system described herein could function with any vending machine for consumable items (e.g. food, drink, medicine), exemplary vending machines include the Crane National 167 Snack Machine and the Dixie Narco 5800 Beverage Machine.

The processing unit 102, in terms of the system described herein, is responsible for uploading and processing the vending machine data 160 and downloading and processing the merged data 180. The processing unit 102 (and the memory 106 therethrough) interacts with the audit technology 120 via communication interface technology 195*a* that is controlled or directed by communication program 195. The processing unit 102 (and the memory 106 therethrough) interacts with the management technology 140 via communication interface technology 195*b* that is controlled by communication program 195. (In the systems shown in FIGS. 3 and 4, there may be only one communication interface technology 195*a* because communications with the management technology 140 could take place via two-way communications with the audit technology 120 (FIG. 3) or via-two-way communications with the management technology 140 directly (FIG. 4).) The management subprogram 155, which is designed to interact with the management program 150, provides the instructions implemented by the processing unit 102. The management subprogram 155, for example, directs the specifics of the transfer and/or storage of data (e.g. what vending machine data 160 is transmitted from the vending machine 100 and/or where the merged data 180 received by the vending machine 100 is stored in memory 106). The processing unit 102 (as directed by the management subprogram 155) may also facilitate access to the nutritional information (received as nutrition data 170 in the merged data 180) such that, when a user selects a product using the user input technology 108, the processing unit 102 displays the nutritional information related thereto.

FIG. 1 and FIG. 5 show exemplary displays 104 that display nutritional information for products stocked within a vending machine 100. An additional preferred feature of the system described herein is that the display 104 may be able to display images of product packages (or a graphic image of the nutrition fact label on the product package), advertisements (e.g. logos, trademarks, and slogans of the products stocked in the vending machine 100), and/or "company" specific messages (e.g. messages about the service company or the company at which the vending machine is located). The display 104 would preferably be near the place where the user makes his selection (user input technology 108) and would be of a size and at a height so that it is easily readable by most users. Multiple displays 104 could be used to accommodate users of reduced stature (e.g. children). It should be noted that some of the figures, including FIG. 5, show displays 104 that are exaggerated in size or that are placed in alternative positions. The display 104 may be, for example, a liquid crystal display (LCD) display, a digital light processing (DLP) display, a plasma display panel (PDP) display, a field emission display (FED), or any other display known or yet to be discovered that can display the nutritional information. In one preferred embodiment, the display 104 is a touch screen display.

The memory 106 is used to store vending machine data 160 (e.g. a vending machine data database) and merged data 180 (including the nutrition data 170). The memory 106 may also include programs necessary to run the vending machine (not shown), a management subprogram 155 (that would interface with the main management program 150), and/or at least one communication program 195 that is used to control the communication interface technology 195*a* and 195*b* and handle data input and output.

The user input technology 108 is the technology associated with the vending machine 100 by which the user inputs an indication of his product selection. The user input technology 108 may be, for example, buttons, knobs, a key pad, or a touch screen display.

The communication interface technology 195*a* and 195*b* is any technology suitable for facilitating communications between the vending machine 100 and the handheld audit technology 120 and between the vending machine 100 and the management technology 140. The communication interface technology 195*a* and 195*b* may be controlled and/or accessed by the communication program 195. The communication interface technology may be for wired communication and/or for wireless communication. In the exemplary system shown in FIG. 2, the communication interface technology 195*a* between the vending machine 100 and the handheld audit technology 120 uses a physical sync whereas the communication interface technology 195*b* between the vending machine 100 and the management technology 140 is shown as wireless and may be implemented as a combination of an antenna (associated with the vending machine 100), a wireless network (e.g. cell or WiFi), and/or the Internet. (The wireless network and/or the Internet are shown as communication technology 190.) In the exemplary system shown in FIG. 3, the communication interface technology 195*a* is a two-way technology (that may be wired or wireless) that transmits vending machine data 160 to the management technology 140 via the handheld audit technology 120 and receives merged data 180 from the management technology 140 via the handheld audit technology 120. In the exemplary system shown in FIG. 4, the communication interface technology 195*a* is a two-way technology (that may be wired or wireless) that transmits vending machine data 160 directly to the management technology 140 and receives merged data 180 directly from the management technology 140.

In one exemplary system, a stand-alone device 101 (FIG. 1) includes at least the management subprogram 155, the communication program 195, and at least one interface technology 195*a*, 195*b*. The stand-alone device 101 could have its own display 104. The stand-alone device 101 would, most likely have its own memory 106 to store the programs 155, 195, but could either use its own memory to store data 160, 180 or could use memory of the vending machine 100. The programs 155, 195 can run a processor in the stand-alone device 101 or could use a processor of the vending machine 100. The stand-alone device 101 is associated with the vending machine 100 and configured to "tap into" the DEX data stream (or any standard vending machine protocol) from a processing unit (that may be processing unit 102) already equipped in the vending machine 100. The stand-alone device 101 is then able to monitor and record sales and usage. Information collected can include, but is not limited to, what product a user purchases after using the display (which may be display 104) to filter nutrition facts. For example, if the user was searching for a product that was 35-10-35 compliant (i.e. the product meets the following nutritional requirements: (1) it has less than 35% of its calories from fat; (2) it has less than 10% of its calories from saturated fat; and (3) it has less than 35% sugar by weight), did the user actually purchase a product that was 35-10-35 compliant and, if not, create a record of the actual product purchased. The stand-alone device 101 may also be used to log and monitor product sales, preferences, and usage on a geographic basis.

Audit Technology 120 (FIG. 6)

To communicate with the vending machines 100, merchandisers use vending machine audit technology 120 that is usually portable and/or handheld to obtain the vending machine data 160. Further, the audit technology 120 is synchronized with management technology 140 that is located at the management site so that the vending machine data 160 from the vending machine 100 can be used for management purposes at the management site. The embodiment in FIG. 2 uses audit technology 120 as an intermediary for communicating vending machine data 160 from the vending machine 100 to the management technology 140. The embodiment in FIG. 3 uses audit technology 120 as a two-way intermediary for communicating vending machine data 160 from the vending machine 100 to the management technology 140 and for communicating merged data 180 from the management technology 140 to the vending machine 100.

The audit technology 120 may be a specific purpose device or may be a general purpose device (e.g. a personal digital assistant) having the necessary capabilities and being specifically programmed (and sometimes physically enhanced and/or modified such as to have the proper technology such as a barcode scanner) to perform the functions of an audit device. Exemplary audit technology is described in U.S. Patent Publication No. 2009/0303982 to Blachman et al. (the "Blachman reference"), U.S. Patent Publication No. 2006/0074777 to Anderson (the "Anderson reference"), and other references disclosed herein, all of which are hereby specifically incorporated by reference.

A handheld audit technology, as shown in FIG. 6, preferably has at least one "associated" processing unit 122, at least one associated display 124, at least one associated memory 126 (for storing, for example, vending machine data 160, merged data 180 (for the system shown in FIG. 3), a management subprogram 156, and/or at least one communication program 196), at least one associated merchandiser input technology 128, and/or at least one associated communication interface technology 196*a* and 196*b*. The processing unit 122, display 124, memory 126, merchandiser input technology 128, and/or communication interface technology 196*a* and 196*b* may be existing audit technology without modification. Alternatively, for systems such as that shown in FIG. 3, merged data 180 and/or a management subprogram 156 may be stored in memory 126.

The processing unit 122, in terms of the system described herein, is responsible for uploading and downloading data (including the vending machine data 160 and, in the system shown in FIG. 3, the merged data 180). The processing unit 122 (and the memory 126 therethrough) interacts with both the vending machine 100 (via communication interface technology 196*a*) and with the management technology 140 (via communication interface technology 196*b*). The management subprogram 156, which is designed to interact with the management program 150, provides the instructions implemented by the processing unit 122. For example, the management subprogram 156 directs the specifics of the transfer and/or storage of data and directs what data is transferred and/or stored. For example, the management subprogram 156 would control the direction in which the vending machine data 160 is received and/or transmitted by the audit technology 120. In the system of FIG. 3, the management subprogram 156 would also control the direction in which the merged data 180 is received and/or transmitted by the audit technology 120.

The audit technology's display 124 and input technology 128 facilitate the merchandiser's interaction with the audit technology 120. An exemplary display 124 might be a liquid crystal display (LCD) display, but other technologies could be used. Exemplary merchandiser input technology 128 could include, key pads, buttons, knobs, fingerprint readers, scanners (e.g. scanners for reading bar codes on products or scanners for reading magnetic media on a merchandiser's identification card), and any other input technology known or yet to be discovered. It should be noted that the display 124 may be a touch screen display such that it would also function as input technology 128.

The memory 126 is used to store vending machine data 160 (e.g. a vending machine data database) and/or merged data 180 (in the system shown in FIG. 3). The memory 126 may also include programs (not shown) necessary to run the audit technology 120, a management subprogram 156 (that would interface with the main management program 150), and/or at least one communication program 196 that is used to control the communication interface technology 196*a* and 196*b* and handle data input and output.

The communication interface technology 196*a* and 196*b* is any technology suitable for facilitating communications between the audit technology 120 and the vending machine 100 and between the audit technology 120 and the management technology 140. The communication interface technology 196*a* and 196*b* may be controlled and/or accessed by the communication program 196. The communication interface technology may be for wired communication and/or for wireless (e.g. telemetry) communication. In the exemplary system shown in FIG. 2, the communication interface technology 196*a* between the audit technology 120 and the vending machine 100 requires a physical sync whereas the communication interface technology 196*b* between the audit technology 120 and the management technology 140 may be physical (e.g. using a sync cradle or hard wire interface) and/or wireless. In the exemplary system shown in FIG. 3, the communication interface technology 196*a* is a two-way technology (that may be wired or wireless) that receives vending machine data 160 from the vending machine 100 and transmits it to the management technology 140 and the communication interface technology 196*b* is a two-way technology (that may be wired or wireless) that receives merged data 180 from the management technology 140 and transmits it to the vending machine 100. It should be noted that some or all of the transmissions may take place using communication technology 190 including, but not limited to antennas, a wireless network (e.g. cell or WiFi), and/or the Internet.

An example of the audit technology may be the traditional handheld dedicated unit carried by merchandisers into the machine site of the field site (e.g. right next to the vending machine). Another example of the audit technology is a "curb side polling" device used by the merchandiser outside of the machine site and/or outside of the field site. In such a situation, the merchandiser is able to determine what products are needed to restock a vending machine before approaching the vending machine. For example, a merchandiser can sit in his truck in the parking lot of the field site and use the audit technology to determine what products are needed for all the vending machines in the field site without having to approach each vending machine.

Management Technology 140 (FIG. 7)

Management technology 140 is technology that the vending service company uses to manage its vending machine network. Management technology 140 generally includes at least one computer, workstation, or server having at least one processor 142, at least one display 144, and at least one management input technology 148 (e.g. keyboards, mice, scanners). The management technology 140 may be implemented as a network of computers, workstations, and/or servers. Although shown as a single memory, the memory 146 may be multiple memories and/or databases. Memory 146 may store, for example, vending machine data 160 (from multiple vending machines in an inventory database 147), a management program 150, and/or at least one communication program 197. The components of the management technology 140 may be located in whole or in part at the vending service company management site. For example, the memory 146 may be stored at a remote or virtual facility (e.g. cloud computing).

The unique management program 150 described herein is not only responsible for directing and/or controlling the management technology 140, but interacts with the vending machine management subprogram 155 and the audit technology management subprogram 156 to direct and/or control the entire system. It is these programs 150, 155, 156 that direct and/or control their respective processing units 142, 102, 122 to carry out the respective uploading and/or downloading of data (including the vending machine data 160 and the merged data 180) as appropriate by providing the instructions to be implemented by the processing unit(s). For example, the management program 150 (or a subprogram or a separate program that is included in the definition of management program 150) directs/controls specifics of the transfer and/or storage of data (e.g. where the data is transferred to) and directs/controls what type of data is transferred and/or stored (as opposed to the technical details of the transfer that would be directed/controlled by the communication program 197). Another example is that the management program 150 (or a subprogram or a separate program that is included in the definition of management program 150) preferably controls how the vending machine data 160 (e.g. machine identifiers and/or inventory data (including product identifiers)) is merged 130 with nutrition data 170 from the nutrition facts data server 132 (and/or with advertising data 170' from the advertising data server 132') to create merged data 180. It should be noted that “inventory data” is a list of products stocked in and/or sold by a vending machine 100 that may be identified by product identifying information (product identifier) such as Product Number, Barcode Number, and/or Product Name. Much of the flow of data in FIGS. 2-4 is controlled by the management program 150 (and its interaction with the vending machine management subprogram 155 and the audit technology management subprogram 156).

It should be noted that the management program 150 described herein could be implemented as a stand-alone program, as part of a custom management program that implements the functions described herein as well as the functions of traditional management programs, and/or as a subprogram or a separate program that works with traditional management programs. Known management programs, as set forth in the Background, use the vending machine data 160 in a variety of ways including, but not limited to cash management, inventory management (tracking or predicting), and/or remote management. MEI EASITRAX® (by MEI of West Chester, Pa. (www.meigroup.com)) is a known network technology solution that facilitates for remote monitoring, dynamic scheduling, and cashless solutions that is an example of known management programs. Additional management programs are produced by Crane Streamware, Validata, and Compuvend.

As shown in FIG. 7, the memory 146 may include an inventory database 147 that may include the vending machine data 160 from multiple vending machines to form a vending machine data database. The memory 146 may also include nutrition data 170 (that could also be in a separate memory in the nutrition facts data server 132) and/or advertising data 170' (that could also be in a separate memory in the advertising data server 132'). It is also possible that merged data 180 could be stored in the memory 146. Finally, the memory 146 may include programs (not shown) necessary to run the management technology 140, the management program 150, and the communication program 197 that is used to control the communication interface technology **197*a* and 197*b*** and handle data input and output.

The management technology’s display 144 and input technology 148 facilitate the vending service’s management team’s interaction with the management technology 140. The management technology’s display 144 and input technology 148 would be that found in standard computers, workstations, and/or servers.

The communication interface technology **197*a* and 197*b* is any technology suitable for facilitating communications between the management technology 140 and the vending machine 100 and between the management technology 140 and the audit technology 120. The communication interface technology 197*a* and 197*b* may be controlled and/or accessed by the communication program 197. The communication interface technology may be for wired communication and/or for wireless communication. In the exemplary system shown in FIG. 2, the communication interface technology 197*a* between the management technology 140 and the vending machine 100 is shown as wireless and may be implemented as a combination of an antenna (associated with the vending machine 100), a wireless network (e.g. cell or WiFi), and/or the Internet. (The wireless network and/or the Internet are shown as communication technology 190.) In the exemplary system shown in FIG. 2, the communication interface technology 197*b* between the management technology 140 and the audit technology 120 may be physical (e.g. using a hard wire interface or sync cradle (shown as sync interface 198) and/or wireless (e.g. a wireless sync). In the exemplary system shown in FIG. 3, the communication interface technology 197*b* is a two-way technology (that may be wired or wireless) that receives vending machine data 160 from the vending machine 100 (via the audit technology 120) and sends merged data 180 to the vending machine 100 (via the audit technology 120). In the exemplary system shown in FIG. 4, the communication interface technology 197*b* is a two-way technology (that may be wired or wireless) that receives vending machine data 160 directly from the vending machine 100 and sends merged data 180 directly to the vending machine 100. It should be noted that some or all of the transmissions may take place using communication technology 190** including, but not limited to antennas, a wireless network (e.g. cell or WiFi), and/or the Internet.

FIGS. 2, 3, 4, and 6 show a nutrition facts data server 132 (and an optional advertising data server 132') and a merge block 130 representing the process of merging the vending machine data 160 with information from the nutrition facts data server 132 (and the advertising data server 132'). Merge 130 may be performed by the processing unit 142 (or by a subprocessor of processing unit 142 or a separate processor). The nutrition facts data server 132 may have its own memory and/or processing or it may use the memory 146 and/or processing unit 142. Similarly, the advertising data server 132' may have its own memory and/or processing or it may use the memory 146 and/or processing unit 142 (or share a memory and/or processing unit with the nutrition facts data server 132). Table 1 shows an exemplary simplified vending machine data table for Vending Machine A (including only the machine identifier and inventory data) before it is merged 130. Table 2 shows an exemplary simplified vending machine data table for Vending Machine B (including only the machine identifier and inventory data) before it is merged 130. Table 3 shows an exemplary simplified nutrition data database associated with the nutrition facts data server 132 (including only inventory data and nutrition data 170) before it is merged 130. Table 4 shows an exemplary simplified merged data table for Vending Machine A (including the machine identifier, inventory data, and nutrition data) after being merged 130. Table 5 shows an exemplary simplified merged data table for Vending Machine B (including the machine identifier, inventory data, and nutrition data) after being merged 130.

TABLE 1

Vending Machine Data Table For Vending Machine A

| Machine Identifier | Inventory Data (product identifier) |
|---|---|
| A | Veggie Snackeroos |
| A | Winkie Dinkies |
| A | Pretzels |

TABLE 2

Vending Machine Data Table For Vending Machine B

| Machine Identifier | Inventory Data (product identifier) |
|---|---|
| B | Veggie Snackeroos |
| B | Cookies |
| B | Apples |

TABLE 3

Nutrition Data Database

| Inventory Data (product identifier) | Nutrition Data (cal) | Nutrition Data (fat) |
|---|---|---|
| Apples | 100 calories | 0 grams fat |
| Cookies | 500 calories | 4 grams fat |
| Pretzels | 300 calories | 3 grams fat |
| Veggie Snackeroos | 100 calories | 2 grams fat |
| Winkie Dinkies | 900 calories | 8 grams fat |

TABLE 4

Merged Data Table For Vending Machine A

| Machine Identifier | Inventory Data (product identifier) | Nutrition Data (cal) | Nutrition Data (fat) |
|---|---|---|---|
| A | Veggie Snackeroos | 100 calories | 2 grams fat |
| A | Winkie Dinkies | 900 calories | 8 grams fat |
| A | Pretzels | 300 calories | 3 grams fat |

TABLE 5

Merged Data Table For Vending Machine B

| Machine Identifier | Inventory Data (product identifier) | Nutrition Data (cal) | Nutrition Data (fat) |
|---|---|---|---|
| B | Veggie Snackeroos | 100 calories | 2 grams fat |
| B | Cookies | 500 calories | 4 grams fat |
| B | Apples | 100 calories | 0 grams fat |

The Data

The management technology 140 receives vending machine data 160 from each vending machine 100. The management technology 140 merges the vending machine data 160 with nutrition data 170 from the nutrition facts data server 132 and/or the advertising data 170' used by the advertising data server 132'. (Although it is preferred that all the products have nutrition data 170 and/or the optional advertising data 170', some products may not have it. For example, a banana may not have advertising data 170'.) The management technology 140 then transmits the merged data 180 back to its respective vending machine 100.

In a standard system, vending machine data 160 includes, but is not limited to information about the machine identifier or Machine ID (e.g. a code or other identifying information to distinguish the vending machine from other vending machines), inventory data (e.g. products stocked in and/or sold by each vending machine that may be identified by product identifiers such as Product Number, Barcode Number, and/or Product Name), inventory level information (e.g. how much of each product was originally stocked and/or was sold), and fund data (e.g. the amount of money received by the vending machine). Common or standard vending machine protocol exists to identify vending machine data 160. Common vending machine protocols used for communicating with vending machines 100 in order to exchange the vending machine data 160 include, for example, DEX/UCS, MDB, and DDCMP, and other data formats or protocols known or yet to be discovered. These industry standard vending machine protocols have definitions that are readily available and not replicated herein. Known systems include management programs that use the vending machine data 160 for purposes such as determining vending machine routing needs, determining profitability, managing cash flow (e.g. cash management), and/or managing inventory (e.g. inventory management, tracking, and/or predicting). It should be noted that the system described herein uses the vending machine data 160 and the common vending machine protocols that already exist in the industry.

A nutrition facts data server 132 includes nutrition data 170 such as that found on the back of food packages. The nutrition data 170 might be arranged, for example, by product identifiers such as Product Number, Barcode Number, and/or Product Name. For each product, nutrition data 170 might include one or more of the following types of data: serving size, calories, fat calories, total fat, saturated fat, trans fat, cholesterol, sodium, total carbohydrates, sugars, protein, vitamins and minerals, ingredients, warnings (e.g. product contains dairy or product may have been made in a factory that also processes nuts), and any other relevant nutritional data. The nutrition data 170 may be provided in any relevant denomination including weight, calories, grams, and percentages (e.g. of daily intake based on a 2,000 calorie diet). The nutrition data 170 might be part of a custom database or it might use information obtained from known sources of such information.

An advertising data server 132' includes advertising data 170'. The nutrition data 170 might be arranged, for example, by product identifiers such as Product Number, Barcode Number, and/or Product Name. For each product, advertising data 170' might include one or more of the following types of data: advertisements (e.g. video or still), trademarks, slogans, interactive communications (e.g. internet), photographs, animation, or any other form of communication or links thereto that would entice a user to buy a product. The advertising data 170' might be part of a custom database or it might use information obtained from known sources of such information.

The merged data 180 uses a common identifier (e.g. the product identifier) to link the vending machine data 160 with the nutrition data 170 (and/or the advertising data 170'). Pseudo-code for performing the merge might look like the following:

Create a blank merged data table for a specific vending machine;

Begin at the first product in the vending machine data for that vending machine;

For each product in the vending machine data:

Create a row in the merged data table;

Search for nutrition data for the product in a nutrition data database; and

Add found nutrition data for the product to the new row of the merged data table.

The System

The vending machine nutritional information display system uses standard inventory control system components such as vending machines 100, vending machine audit technology 120, and management technology 140. It should also be noted that the system described herein uses the vending machine data 160 and the common vending machine protocols that already exist in the industry. Finally, it should be noted that the system may be designed to function with traditional management programs (e.g. it may be integrated into, work as a subprogram of, or be a separate program that works with traditional management programs).

The system described herein includes a method and apparatus by which nutritional information for products stocked within a vending machine 100 is merged with nutrition data 170 only for those products stocked in the vending machine 100. FIGS. 2, 3, 4, and 6 show a merge block 130 in which select information (e.g. inventory data representing the specific products stocked in the vending machine 100) is obtained from the vending machine data 160, nutrition data 170 is obtained from the nutrition facts data server 132 (and/or nutrition facts database stored in the server 132 or a memory associated therewith) only for products specified in the inventory data, and then the nutrition data 170 for the inventory of the machine is merged. (In an optional embodiment, advertising data 170' is obtained from the advertising data server 132' (and/or advertising database stored in the server 132' or a memory associated therewith) only for products specified in the inventory data, and then the advertising data 170' for the inventory of the machine is merged). Tables 1-5 show an example of how this might be accomplished. In preferred systems this merger of vending machine data 160 (or select information thereof) is handled on a machine-by-machine basis for each vending machine 100. In the preferred system, the extracted information from the vending machine data 160 that is to be merged includes, at minimum, unique product identifiers (inventory data) for all products in a given vending machine 100. The extracted information may also include the column identification within the machine for each product. The extracted data is merged with nutrition information that is maintained in a nutrition facts database containing the universe of products that are available for vending machines 100. The "universe of products" may be narrowed to only those products available from that service company or only available in the region.

The system described herein also includes a vending machine nutritional information display system in which nutrition data 170 may be displayed on a vending machine display 104 as nutritional information for those products stocked within the vending machine 100. Nutrition data 170 (provided in the merged data 180 from the management technology 140) is available to the vending machine user as nutritional information prior to purchase. For example, a vending machine user can use a touch-screen interface 104, 108 to select a particular product (e.g. selecting the veggie snackeroos in column B7 by simply entering "B7" on the touch screen) and read the nutrition facts and ingredients for the veggie snackeroos on the same display. Alternatively, the user can search for a product by name or filter product choices in a vending machine 100 by one or more nutrition facts and/or ingredients (such as show all products that contain less than 35% fat, 10% saturated fat, and 35% sugar; or products under 200 calories), or other characteristics pertinent to an individual's dietary needs and choices (for example vegetarian or kosher products).

It should be noted that one preferred feature of the system described herein is that nutrition information for products in any given vending machine could be checked online prior to approaching the machine. Each vending machine already has a unique machine identifier. A user could go to a website that has access to the management technology 140 where the user inputs his location and is provided with a list of nearby vending machines, each of which has its real-time inventory online, and each product has nutritional information thereon. The user could search for specific products or search using filters based on the nutritional information. Alternatively, each vending machine could have its own website and be searchable online. The user would be able to view information about products in a specific vending machine from the convenience of their computer prior to approaching the vending machine. For example, if a user needed a peanut-free product, he could login to a vending service company website, input his location (e.g. by address), and use the peanut-free product filter. The user would be provided a list of all the vending machines 100 located nearby that had peanut-free products as well as a list of the specific products available. The user would have the ability to get additional nutritional information on each of the products as well as the ability to determine when that product was stocked (to verify freshness).

It should be noted that one preferred feature of the system described herein is that maintenance of inventory data can be performed such that when a product sells out in a vending machine 100, the nutrition information is removed from being displayed at that machine 100.

It should be noted that one preferred feature of the system described herein is that operators (e.g. the merchandiser) can update product information directly at the vending machine level through the touch screen interface 104, 108 after entering an administrative mode. If the stand-alone device 101 in the vending machine 100 is equipped with a barcode scanner (as a user input technology 108), the operator (merchandiser) scans the product being added to the vending machine 100 or removed from the vending machine 100. Once a product is scanned and added to the system, the nutrition information is then downloaded from the nutrition facts server 132 (and/or advertising data 170' is downloaded from the advertising data server 132').

Figure 8A:
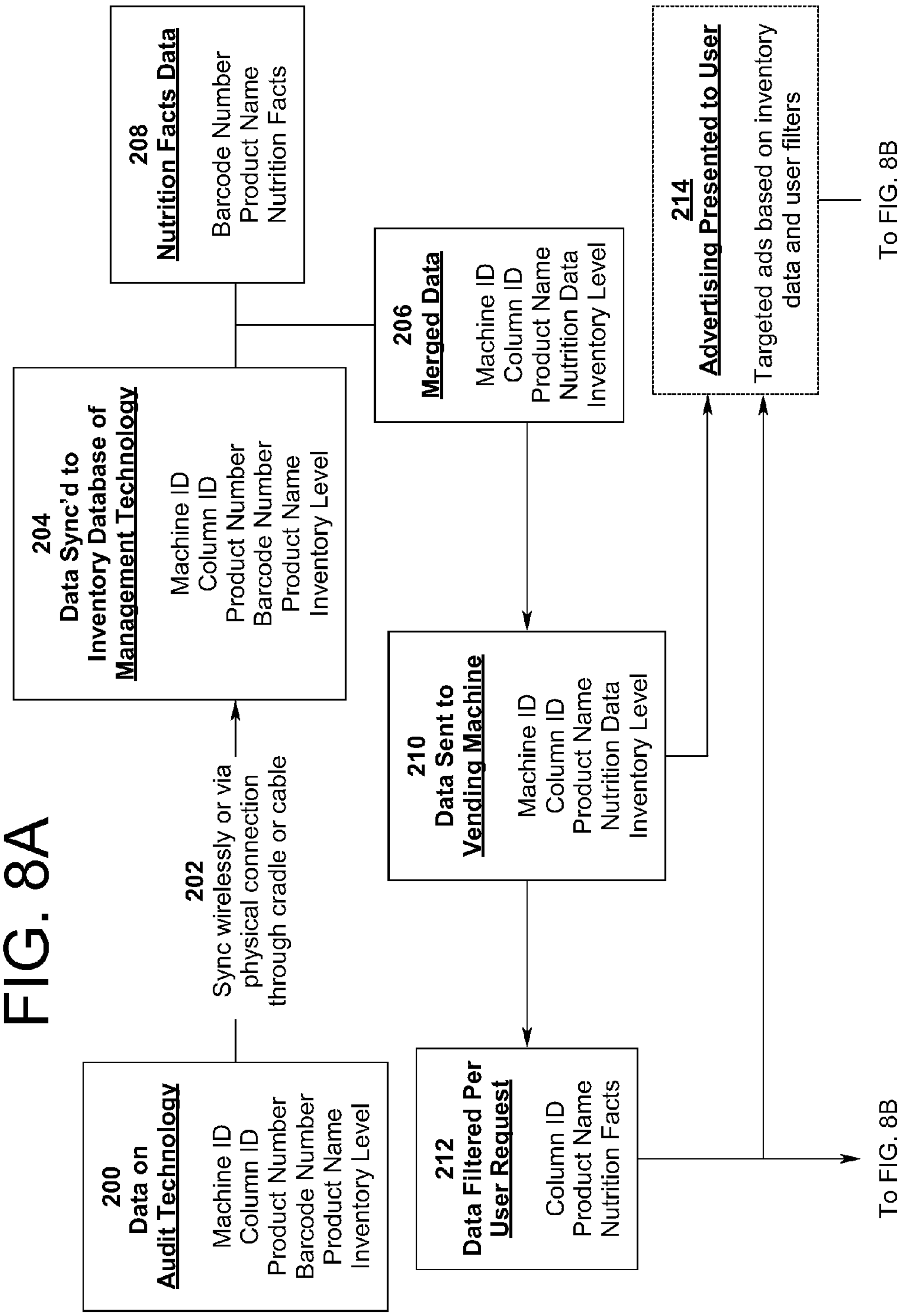
FIGS. 8A and 8B are a simplified data flow chart showing an exemplary flow of data for a vending machine nutritional information display system.
Figure 8B:
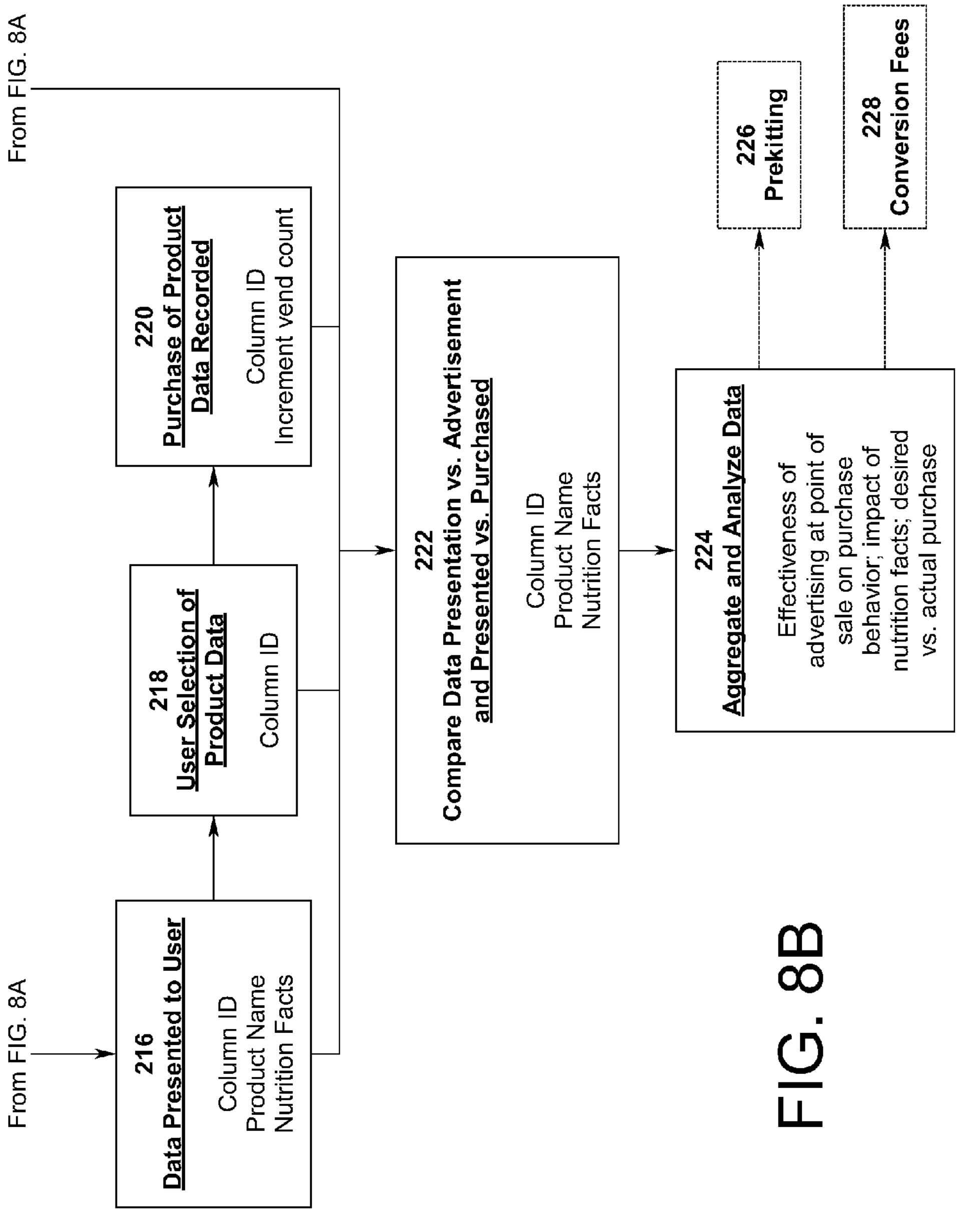

FIGS. 8A and 8B together are a flow chart illustrating the methods and systems disclosed herein. It will be understood that each block of this flow chart, components of all or some of the blocks of this flow chart, and/or combinations of blocks in this flow chart, may be implemented by software (e.g. computer program instructions, software programs, subprograms), by hardware (e.g. processors, memory), by firmware, and/or a combination of these forms. Block 200 shows the type of vending machine data the audit technology might have for a vending machine and its products. Blocks 202 and 204 show that the information on the audit technology may be synced (wirelessly or via a physical connection through a cradle or cable) to the vending machine data for that particular vending machine in the inventory database of the management technology. Block 206 shows the resulting merged data after some of the vending machine data (e.g. Machine ID, Column ID, Product Name, and Inventory Level) has been merged with nutrition facts data from block 208. At block 210 the merged data is sent to the vending machine. As shown in the figures, the information from block 210 may be used for data filtering based on a user's request (block 212) or used in advertising presented to the user (block 214—that may be targeting advertising based on information block 214 receives from block 212). Block 216 shows that data is presented to the user and then, the user selects the product (block 218) and purchases the product (block 220). The data from blocks 214, 216, 218, and 220 are preferably recorded so that at block 22 comparisons can be made pertaining to advertising presented to the user (block 212), information presented to the user (block 216), the product selected by the user (block 218), and the purchase itself (block 220). At block 224 that data may be aggregated and analyzed. It should be noted that the functions of block 222 and block 224 may be performed at the management technology 140 after the information from blocks 214, 216, 218, and 220 is transferred. Alternatively, the functions of block 222 and block 224 may be performed at the vending machine 100 so that it is available to the merchandiser. Finally, blocks 226 and 228 show some of the practical uses for the information from blocks 222 and 224. Specifically, block 226 shows the information being used for "pre-kitting." Pre-kitting would most likely be used in a system such as shown in FIG. 4, where the management technology 140 handles product assignment. Block 208, shows the information's use with "conversion fees." Conversion fees are the fees collected by a service company when nutritional information and/or an advertisement is displayed to a user and the user purchases the product.

Comparison to Existing Technology

It should be noted that the vending machine nutritional information display system described herein primarily uses standard inventory control system components such as vending machines 100, vending machine audit technology 120, and management technology 140 as well as common or standard vending machine protocols.

Existing systems maintain product and inventory data with the use of audit technology that synchronizes the vending machine data with an inventory database at a vending service company's management site (e.g. the distribution center). The audit technology can synchronize the vending machine data through a cradle physically connected to the network at the operator's office or wirelessly from the field. These databases typically maintain a list of all products stocked in each vending machine (inventory data for each vending machine) along with the location within the machine and quantity (ex: 5 quantity Brand X Peanuts 1.75 oz package in column E6).

The Reade reference is directed to an RFID system and method for vending machine control. The Reade method and system seeks to aid consumers in making informed decisions prior to purchasing products from a vending. The Reade reference further discloses that product information may be visually displayed on a visual display screen. The Reade reference, it should be noted, requires that the products in the machine be associated with an added smart tag or label that contains information regarding the product that may be of interest to a consumer prior to purchasing the product. A smart tag scanner is incorporated with the dispensing machine and used to retrieve the product information from the smart tags.

As compared to the system described herein, the Reade system's use of smart tags requires significantly more work. In the Reade system, the smart tags must be programmed and/or provided to the merchandiser that would require a change in the industry or additional work for the merchandiser or the vending service company. The system described herein makes absolutely no changes to the process currently used by most merchandisers and/or vending service companies. In the Reade system, the appropriate smart tags must be attached to each individual product or placed at each column of a vending machine (and moved or replaced if the product arrangement changes or if the products being stocked changes). Again, the system described herein avoids this extra work and makes absolutely no changes to the process currently used by most merchandisers and/or vending service companies. In the Reade system, the smart tags would have to be removed and replaced if the product information contained thereon changes. Again, the system described herein avoids this extra work and makes absolutely no changes to the process currently used by most merchandisers and/or vending service companies. In the Reade system, the additional programming, attachment of smart tags, placement of smart tags, and removal or replacement of smart tags all introduce steps where errors can occur (e.g. errors in programming of smart tag, errors in attaching the wrong smart tag to a product, errors in forgetting to transfer the smart tag based on product changes, etc.) Because the system described herein eliminates these added steps, it is more accurate. It eliminates many steps in which the errors occur because it is more automatic and requires little interaction by the merchandiser. Further, the Reade system would require significant additional technology such as a smart tag scanner.

Supplemental Information

It is to be understood that the inventions, examples, and embodiments described herein are not limited to particularly exemplified materials, methods, and/or structures. Further, all publications, patents, and patent applications cited herein, whether supra or infra, are hereby incorporated by reference in their entirety.

Please note that the terms and phrases may have additional definitions and/or examples throughout the specification. Where otherwise not specifically defined, words, phrases, and acronyms are given their ordinary meaning in the art. The following paragraphs provide some of the definitions for terms and phrases used herein.

The term "associated" is defined to mean integral or original, retrofitted, attached, or positioned near. For example, if a display 104 (or other component) is associated with a vending machine (or other technology), the display may be an original display built into the vending machine 100, a display that has been retrofitted into the vending machine 100, an attached display that is attached to the vending machine 100, and/or a nearby display that is positioned near the vending machine 100.

The terms "processing unit," "processor," and "computer" are defined as devices capable of executing instructions or steps and may be implemented as a programmable logic device or other type of programmable apparatus known or yet to be discovered. The processor, processing unit, and computer may have associated memory. The processor, processing unit, and computer may be implemented using a general purpose processor (e.g. microprocessor, controller, microcontroller, or state machine), a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. Although shown as single units, it should be noted that the processing units may be implemented as a plurality of separate processing units. Similarly, multiple processors may be combined. For example, the processing unit 142 may be a separate processor from the processing units (not shown) in the nutrition facts data server 132 and/or the advertising data server 132' or the functions of these processing units can all be combined into a single processing unit.

The term "memory" is defined to include any type of computer (or other technology)-readable media (also referred to as machine-readable storage medium) including, but not limited to attached storage media (e.g. hard disk drives, network disk drives, servers), internal storage media (e.g. RAM, ROM, EPROM, FLASH-EPROM, or any other memory chip or cartridge), removable storage media (e.g. CDs, DVDs, flash drives, memory cards, floppy disks, flexible disks), firmware, and/or other storage media known or yet to be discovered. Although shown as single units, it should be noted that the memories may be implemented as a plurality of separate memories. Similarly, multiple memories may be combined. For example, the management program 150 may be stored in a memory separate from the memory in which the communication program 197 is stored. Another example is that, the nutrition data 170 used by the nutrition facts data server 132 and/or the advertising data 170' used by the advertising data server 132' may be stored in distinct memories (not shown) accessible by the servers 130, 132', or the data may be stored in the shared memory 146 that would be made accessible by the servers 130, 132'.

It should be noted that the terms "programs" and "subprograms" are defined as a series of instructions that may be implemented as software (i.e. computer program instructions or computer-readable program code) that may be loaded onto a computer to produce a machine, such that the instructions that execute on the computer create structures for implementing the functions described herein or shown in the figures. Further, these programs and subprograms may be loaded onto a computer so that they can direct the computer to function in a particular manner, such that the instructions produce an article of manufacture including instruction structures that implement the function specified in the flow chart block or blocks. The programs and subprograms may also be loaded onto a computer to cause a series of operational steps to be performed on or by the computer to produce a computer implemented process such that the instructions that execute on the computer provide steps for implementing the functions specified in the flow chart block or blocks. The phrase "loaded onto a computer" also includes being loaded into the memory of the computer or a memory associated with or accessible by the computer. The shown programs and subprograms may be divided into multiple modules or may be combined.

The terms "provide" and "providing" (and variations thereof) are meant to include standard means of provision including "transmit" and "transmitting," but can also be used for non-traditional provisions as long as the data is "received" (which can also mean obtained). The terms "transmit" and "transmitting" (and variations thereof) are meant to include standard means of transmission, but can also be used for non-traditional transmissions as long as the data is "sent." The terms "receive" and "receiving" (and variations thereof) are meant to include standard means of reception, but can also be used for non-traditional methods of obtaining as long as the data is "obtained."

Unless specifically stated otherwise, the terms "first," "second," and "third" are meant solely for purposes of designation and not for order or limitation. For example, the "first preferred exemplary vending machine nutritional information display system" has no order relationship with the "second preferred exemplary vending machine nutritional information display system."

It should be noted that, unless otherwise specified, the term "or" is used in its nonexclusive form (e.g. "A or B" includes A, B, A and B, or any combination thereof, but it would not have to include all of these possibilities). It should be noted that, unless otherwise specified, "and/or" is used similarly (e.g. "A and/or B" includes A, B, A and B, or any combination thereof, but it would not have to include all of these possibilities). It should be noted that, unless otherwise specified, the term "includes" means "comprises" (e.g. a device that includes or comprises A and B contains A and B but optionally may contain C or additional components other than A and B). It should be noted that, unless otherwise specified, the singular forms "a," "an," and "the" refer to one or more than one, unless the context clearly dictates otherwise.

All the references cited herein are incorporated by reference.

The terms and expressions that have been employed in the foregoing specification are used as terms of description and not of limitation, and are not intended to exclude equivalents of the features shown and described. This application is intended to cover any adaptations or variations of the present invention. It will be appreciated by those of ordinary skill in the art that any arrangement that is calculated to achieve the same purpose may be substituted for the specific embodiment shown. It is also to be understood that the following claims are intended to cover all of the generic and specific features of the invention herein described and all statements of the scope of the invention which, as a matter of language, might be said to fall therebetween.

What is claimed is:

1. An apparatus comprising a processor and a memory storing executable instructions that in response to execution by said processor cause said apparatus to at least:

(a) receive vending machine data uploaded from a vending machine using standard vending machine protocol, said vending machine data including inventory data listing products stocked in or sold by said vending machine, and at least one of inventory level information indicating an amount of the products listed in said inventory data, or fund data indicating an amount of funds received by said vending machine, and said vending machine data being received for storage in an inventory database with machine data from other vending machines to permit performance of one or more management operations for the respective vending machines using said vending machine data, said one or more management operations including at least one of determining vending machine routing needs, determining profitability, managing cash flow or managing inventory;

(b) transmit inventory data from said inventory database to a separate nutrition server, and in response thereto, receive nutrition data for products listed in said inventory data;

(c) merge said vending machine data with said nutrition data to obtain merged data, said merged data including at least said inventory data and said nutrition data; and (d) transmit said merged data to said vending machine in a communication separate from the upload of said vending machine data, said merged data being transmitted for display of said nutrition data on a display of said vending machine based on user selection of products thereat, said vending machine data being received and merged with said nutrition data, and said merged data being transmitted to said vending machine, before and independent of said user selection.

2. The apparatus of claim 1, said apparatus being caused to receive said vending machine data from said vending machine via at least one audit technology using standard vending machine protocol.

3. The apparatus of claim 2, said apparatus being caused to receive vending machine data including being caused to synch said at least one audit technology configured to store said vending machine data with an inventory database configured to maintain vending machine data for said vending machine.

4. The apparatus of claim 1, said apparatus being caused to receive said vending machine data from said vending machine using wireless communication technology.

5. The apparatus of claim 1, said apparatus being caused to transmit said merged data to said vending machine using wireless communication technology.

6. The apparatus of claim 1, said memory storing further executable instructions that in response to execution by said processor cause said apparatus to merge said vending machine data with advertising data for products listed in said inventory data, said inventory data being merged with said advertising data based on said inventory data to obtain merged data.

7. An apparatus associated with a vending machine, and comprising a processor and a memory storing executable instructions that in response to execution by said processor cause said apparatus to at least:

(a) transmit vending machine data uploaded to management technology using standard vending machine protocol, said vending machine data including inventory data listing products stocked in or sold by said vending machine, and at least one of inventory level information indicating an amount of the products listed in said inventory data, or fund data indicating an amount of funds received by said vending machine, said vending machine data being transmitted for storage in an inventory database with machine data from other vending machines to permit said management technology to perform of one or more management operations for the respective vending machines using said vending machine data, said one or more management operations including at least one of determining vending machine routing needs, determining profitability, managing cash flow or managing inventory, said management technology being configured to transmit inventory data from said inventory database to a separate nutrition server, and in response thereto, receive nutrition data for products listed in said inventory data, and said management technology being configured to merge said vending machine data with said nutrition data to obtain merged data, said merged data including at least said inventory data and said nutrition data;

(b) receive said merged data from said management technology in a communication separate from the upload of said vending machine data; and (c) cause display of said nutrition data in response to user selection of products at said vending machine, said vending machine data being transmitted and merged with said nutrition data, and said merged data being received from said management technology, before and independent of said user selection.

8. The apparatus of claim 7 implemented as a stand-alone device retrofittable into said vending machine.

9. The apparatus of claim 7 built into said vending machine.

10. The apparatus of claim 7 further comprising at least one user input technology.

11. The apparatus of claim 7, said apparatus being caused to transmit vending machine data to said management technology via at least one audit technology using standard vending machine protocol.

12. The apparatus of claim 7, said apparatus being caused to receive said merged data from said management technology via at least one audit technology using standard vending machine protocol.

13. The apparatus of claim 7, said apparatus being caused to transmit vending machine data to said management technology using wireless communication technology.

14. The apparatus of claim 7, said apparatus being caused to receive said merged data from said management technology using wireless communication technology.

15. A method comprising:

(a) receiving vending machine data uploaded from a vending machine using standard vending machine protocol, said vending machine data including inventory data listing products stocked in or sold by said vending machine, and at least one of inventory level information indicating an amount of the products listed in said inventory data, or fund data indicating an amount of funds received by said vending machine, and said vending machine data being received for storage in an inventory database with machine data from other vending machines to permit performance of one or more management operations for the respective vending machines using said vending machine data, said one or more management operations including at least one of determining vending machine routing needs, determining profitability, managing cash flow or managing inventory;

(b) transmitting inventory data from said inventory database to a separate nutrition server, and in response thereto, receiving nutrition data for products listed in said inventory data;

(c) merging said vending machine data with said nutrition data to obtain merged data, said merged data including at least said inventory data and said nutrition data; and (d) transmitting said merged data to said vending machine in a communication separate from the upload of said vending machine data, said merged data being transmitted for display of said nutrition data on a display of said vending machine based on user selection of products thereat, said vending machine data being received and merged with said nutrition data, and said merged data being transmitted to said vending machine, before and independent of said user selection, wherein said receiving, merging and transmitting are performed by an apparatus comprising a processor and a memory storing executable instructions that in response to execution by said processor cause said apparatus to perform said receiving, merging and transmitting.

16. The method of claim 15, said receiving vending machine data including receiving vending machine data from said vending machine via at least one audit technology using standard vending machine protocol.

17. The method of claim 15, said transmitting said merged data including transmitting said merged data to said vending machine via at least one audit technology using standard vending machine protocol.

18. The method of claim 15, said receiving vending machine data including receiving vending machine data from said vending machine using wireless communication technology.

19. The method of claim 15, said transmitting said merged data including transmitting said merged data to said vending machine using wireless communication technology.

20. A method comprising:

(a) transmitting vending machine data uploaded to management technology using standard vending machine protocol, said vending machine data including inventory data listing products stocked in or sold by said vending machine, and at least one of inventory level information indicating an amount of the products listed in said inventory data, or fund data indicating an amount of funds received by said vending machine, said vending machine data being transmitted for storage in an inventory database with machine data from other vending machines to permit said management technology to perform of one or more management operations for the respective vending machines using said vending machine data, said one or more management operations including at least one of determining vending machine routing needs, determining profitability, managing cash flow or managing inventory, said management technology being configured to transmit inventory data from said inventory database to a separate nutrition server, and in response thereto, receive nutrition data for products listed in said inventory data, and said management technology being configured to merge said vending machine data with said nutrition data to obtain merged data, said merged data including at least said inventory data and said nutrition data;

(b) receiving said merged data from said management technology in a communication separate from the upload of said vending machine data;

(c) causing display of said nutrition data in response to user selection of products at said vending machine, said vending machine data being transmitted and merged with said nutrition data, and said merged data being received from said management technology, before and independent of said user selection, wherein said transmitting, receiving and causing display are performed by an apparatus associated with said vending machine, and comprising a processor and a memory storing executable instructions that in response to execution by said processor cause said apparatus to perform said transmitting, receiving and causing display.

* * * * *